United States Patent
Fukushima et al.

(10) Patent No.: US 12,534,041 B2
(45) Date of Patent: Jan. 27, 2026

(54) IGNITER ASSEMBLY AND GAS GENERATOR

(71) Applicant: DAICEL CORPORATION, Osaka (JP)

(72) Inventors: Akira Fukushima, Tokyo (JP); Shinya Yamamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/275,657

(22) PCT Filed: Jan. 31, 2022

(86) PCT No.: PCT/JP2022/003603
§ 371 (c)(1),
(2) Date: Aug. 3, 2023

(87) PCT Pub. No.: WO2022/168795
PCT Pub. Date: Aug. 11, 2022

(65) Prior Publication Data
US 2024/0294138 A1     Sep. 5, 2024

(30) Foreign Application Priority Data
Feb. 4, 2021 (JP) .................................. 2021-016735

(51) Int. Cl.
*B60R 21/274* (2011.01)
*B60R 21/26* (2011.01)
*B60R 21/264* (2006.01)

(52) U.S. Cl.
CPC ........ *B60R 21/274* (2013.01); *B60R 21/2644* (2013.01); *B60R 2021/26029* (2013.01)

(58) Field of Classification Search
CPC . B60R 21/274; B60R 21/2644; B60R 21/264; B60R 2021/26029
See application file for complete search history.

(56) References Cited

U.S. PATENT DOCUMENTS

| | | | |
|---|---|---|---|
| 5,005,486 A | 4/1991 | Lenzen | |
| 5,564,743 A * | 10/1996 | Marchant | ......... B60R 21/01546 280/736 |

(Continued)

FOREIGN PATENT DOCUMENTS

JP        2006284151 A  *  10/2006  .............. F42B 3/103

OTHER PUBLICATIONS

International Search Report for International Application No. PCT/JP2022/003603, dated Mar. 8, 2022, with English translation.

(Continued)

*Primary Examiner* — Minnah L Seoh
(74) *Attorney, Agent, or Firm* — Birch, Stewart, Kolasch & Birch, LLP (57) ABSTRACT

An igniter assembly includes an igniter including a container and an ignition charge. The igniter emits a combustion product of the ignition charge when a lid wall portion is ruptured upon operation of the igniter. The container includes a peripheral wall portion and the lid wall portion closing one end of the peripheral wall portion. The ignition charge is filled in an accommodating space defined by the peripheral and lid wall portions. A tubular wall portion surrounds the peripheral wall portion. The tubular wall portion defines an emitting space in which the combustion product is emitted. The lid wall portion includes an annular outer peripheral region portion connected to one end of the peripheral wall portion and a central region portion positioned inside the outer peripheral region portion in a radial direction. The outer peripheral region portion is formed thicker than the central region portion.

20 Claims, 7 Drawing Sheets

(56) References Cited

U.S. PATENT DOCUMENTS

| | | | |
|---|---|---|---|
| 6,168,201 B1* | 1/2001 | Takeyama | B60R 21/264 |
| | | | 280/741 |
| 7,540,241 B2 | 6/2009 | Bierwirth | |
| 2003/0116052 A1* | 6/2003 | Fogle, Jr. | B60R 21/2644 |
| | | | 102/530 |
| 2003/0146612 A1* | 8/2003 | Doi | B60R 21/2644 |
| | | | 280/741 |
| 2004/0160046 A1 | 8/2004 | Tanaka et al. | |
| 2009/0115175 A1* | 5/2009 | Nishimura | B60R 21/2644 |
| | | | 280/741 |
| 2013/0276662 A1* | 10/2013 | Ohsugi | C06D 5/00 |
| | | | 102/530 |
| 2013/0305952 A1* | 11/2013 | Fukumoto | C06D 5/06 |
| | | | 149/75 |
| 2018/0170303 A1* | 6/2018 | Izuma | B60R 21/2644 |
| 2019/0201829 A1* | 7/2019 | Yamaguchi | B01D 46/528 |
| 2019/0217808 A1* | 7/2019 | Izuma | B60R 21/264 |
| 2020/0238945 A1 | 7/2020 | Bierwirth et al. | |

OTHER PUBLICATIONS

Written Opinion of the International Searching Authority for International Application No. PCT/JP2022/003603, dated Mar. 8, 2022, with English translation.

Extended European Search Report for European Application No. 22749667.6, dated Nov. 26, 2024.

\* cited by examiner

IGNITER ASSEMBLY AND GAS GENERATOR

TECHNICAL FIELD

The present invention relates to an igniter assembly and a gas generator including the igniter assembly.

BACKGROUND ART

An igniter is used as a starting device of a gas generator for an airbag or a gas generator for a seat belt retractor, and mainly an electric igniter is widely known which is operated by an ignition current. As a structure for attaching an igniter to a gas generator, an igniter assembly is known in which an igniter is attached via a resin to a tubular member provided in a housing.

In this regard, in the gas generator presented in Patent Document 1, an attachment portion having a tubular shape and attached with the igniter is formed at the central portion of the bottom plate of the housing, and the igniter is fixed to the attachment portion by a resin provided between the igniter and the attachment portion. This resin further forms a peripheral wall portion surrounding the igniter, and a space inside the peripheral wall portion is filled with a gas generating agent of which combustion is caused by operation of the igniter. A space into which a connector for supplying a current to the igniter is inserted is formed on the other end side of the attachment portion.

CITATION LIST

Patent Document

Patent Document 1: U.S. Pat. No. 7,540,241
Patent Document 2: U.S. Pat. No. 5,005,486

SUMMARY OF INVENTION

Technical Problem

When the igniter is operated, a container made of metal and accommodating an ignition charge is ruptured to emit flame. In a structure where a peripheral wall portion made of resin surrounds the igniter, when the container ruptured by operation of the igniter comes into contact with the peripheral wall portion, the peripheral wall portion may be deformed by a load acting on the peripheral wall portion, and the peripheral wall portion may have a crack or damage. In such a case, depending on the state of the crack or damage, there is a concern that the holding of the igniter becomes insufficient or the sealability as the gas generator is impaired.

The technology of the present disclosure has been made in view of the above problem, and an object is to provide a technology that can inhibit a large load from acting on a peripheral wall portion, made of resin, by a lid wall portion of a cup body ruptured when an igniter is operated in an igniter assembly having the structure where the peripheral wall portion surrounds the igniter.

Solution to Problem

To solve the above problem, the technique of the present disclosure adopts the following configuration. That is, the technology of the present disclosure is an igniter assembly, including: an igniter including a container made of metal and an ignition charge, the igniter being configured to emit a combustion product of the ignition charge to an outside of the container when a lid wall portion is ruptured when the igniter is operated, the container including a peripheral wall portion having a tubular shape and the lid wall portion configured to close one end portion of the peripheral wall portion, the ignition charge being filled in an accommodating space defined by the peripheral wall portion and the lid wall portion; and a tubular wall portion made of resin and formed in a tubular shape in a manner that the peripheral wall portion is surrounded, the tubular wall portion inwardly forming an emitting space in which the combustion product of the ignition charge is emitted. The lid wall portion includes an annular outer peripheral region portion disposed inside the peripheral wall portion in a radial direction of the peripheral wall portion, and a central region portion positioned inside the outer peripheral region portion in a radial direction, and the outer peripheral region portion is formed thicker than the central region portion.

When the igniter is operated, the lid wall portion is deformed and opens on the emitting space side from one end portion of the peripheral wall portion as a starting point by the combustion pressure of the ignition charge. At this time, in the igniter assembly of the present disclosure, since the outer peripheral region portion is formed thicker than the central region portion, the outer peripheral region portion has higher rigidity than a central region portion and is less likely to be deformed. As a result, since the outer peripheral region portion connected to the peripheral wall portion is less likely to be deformed, the lid wall portion is inhibited from largely opening. Thus, the ruptured lid wall portion is inhibited from coming into strong contact with the tubular wall portion. That is, the ruptured lid wall portion does not come into contact with the tubular wall portion, or even if coming into contact, a large load does not occur. As a result, according to the igniter assembly according to the present disclosure, it is possible to inhibit a large load from acting on the tubular wall portion due to the lid wall portion ruptured when the igniter is operated, the occurrence of a crack or damage in the tubular wall portion can be suppressed.

In the igniter assembly described above, the outer peripheral region portion and the central region portion may be connected in such a manner that an emitting surface facing the emitting space in the lid wall portion is recessed in the central region portion.

In the igniter assembly described above, the central region may include a plurality of grooves extending radially from a central portion of the central region portion as a starting point.

In the igniter assembly described above, a distance in the radial direction from the central portion of the central region portion to the outer peripheral region portion may be ½ or less of a distance in the radial direction from the central portion to the tubular wall portion.

In the igniter assembly described above, the emitting space may be filled with a first gas generating agent to be ignited by a combustion product of the ignition charge.

The technology of the present disclosure may be a gas generator including: the igniter assembly described above; a housing attached with the igniter assembly; a combustion chamber formed inside the housing and filled with a second gas generating agent of which combustion is caused by operation of the igniter; and a gas discharge port formed at the housing and allowing the combustion chamber and an external space of the housing to communicate with each other.

The gas generating agent of the present disclosure includes a gas generating agent that generates a combustion gas for inflating an airbag, and a transfer charge for causing combustion of the gas generating agent.

Advantageous Effects of Invention

According to the present disclosure, it is possible to inhibit a large load from acting on a peripheral wall portion, made of resin, by a lid wall portion of a cup body ruptured when an igniter is operated in an igniter assembly having a structure in which the peripheral wall portion surrounds the igniter.

DESCRIPTION OF EMBODIMENTS

Hereinafter, embodiments of the present disclosure will be described with reference to the drawings. Note that the respective configurations and the combinations thereof in the respective embodiments are examples, and the configurations can be added, omitted, substituted, and differently modified as appropriate within a scope not departing from the spirit of the present invention. The present disclosure is not limited to the embodiments, but only limited to the claims.

First Embodiment

Figure 1:
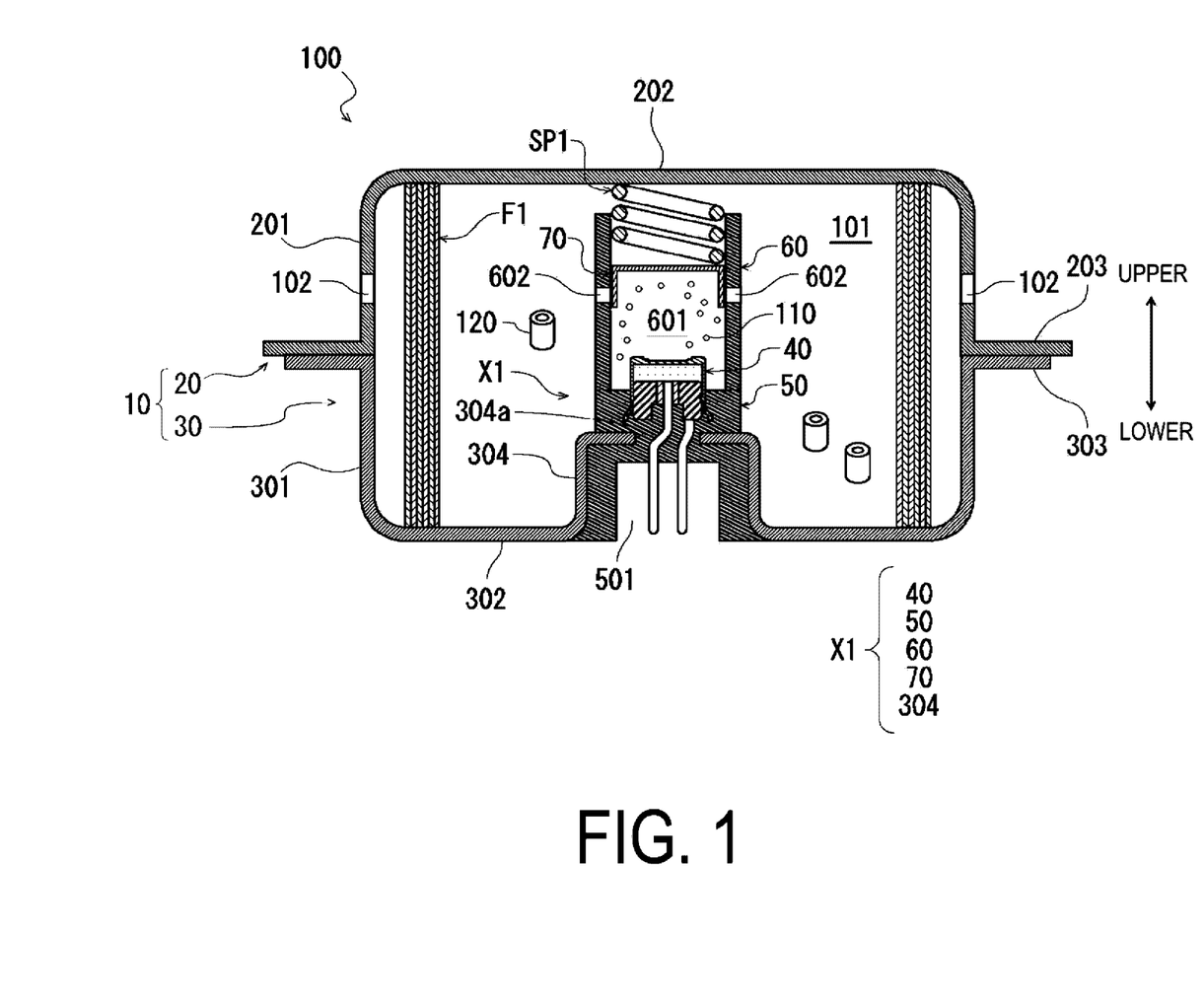
FIG. 1 is a cross-sectional view of a gas generator for an airbag including an igniter assembly according to a first embodiment.

Hereinafter, an aspect in which the technology of the present disclosure is applied to an igniter assembly of a gas generator for an airbag will be described as a first embodiment. However, the application of the igniter assembly according to the first embodiment is not limited to this, and may be applied to a gas generator for a seat belt retractor, for example. FIG. 1 is a cross-sectional view of a gas generator for an airbag (hereinafter simply referred to as a gas generator) 100 including an igniter assembly X1 according to the first embodiment. FIG. 1 illustrates a state before the igniter indicated by reference sign 40 is operated. The gas generator 100 is configured as a so-called single type gas generator including one igniter. As illustrated in FIG. 1, the gas generator 100 includes a housing 10, an igniter 40, a holding part 50, a tubular wall portion 60, a lid member 70, a spring member SP1, and a filter F1. The gas generator 100 is configured to cause combustion of a first gas generating agent 110 and a second gas generating agent 120 filled in the housing 10 by operating the igniter 40 disposed in the housing 10, and to inflate an airbag (not illustrated) by emitting a combustion gas that is a combustion product to the outside of the housing 10. Hereinafter, respective configurations of the gas generator 100 will be described.

Housing

As illustrated in FIG. 1, the housing 10 is formed in a short tubular shape in which both ends in the axial direction are closed by joining, in a state where the opening ends face each other, an upper shell 20 and a lower shell 30 made of metal and each formed in a bottomed tubular shape. However, the configuration of the upper shell 20 and the lower shell 30 are not limited to this, and a known configuration can be appropriately used. Here, a direction along the axial direction of the housing 10 is defined as an up-down direction of the gas generator 100, the upper shell 20 side (that is, the upper side in FIG. 1) is defined as an upper side of the gas generator 100, and the lower shell 30 side (that is, the lower side in FIG. 1) is defined as a lower side of the gas generator 100.

The upper shell 20 includes an upper tube portion 201 having a tubular shape, a top plate portion 202 that closes an upper end of the upper tube portion 201, and a joint portion 203 extending radially outward from a lower end portion of the upper tube portion 201. The lower shell 30 includes a lower tube portion 301 having a tubular shape, a bottom plate portion 302 that closes a lower end of the lower tube portion 301, and a joint portion 303 extending radially outward from an upper end portion of the lower tube portion 301. The joint portion 203 of the upper shell 20 and the joint portion 303 of the lower shell 30 are overlapped and joined by laser welding or the like to form the housing 10. In the upper tube portion 201 of the upper shell 20, a plurality of gas discharge ports 102 allowing the inside and the outside of the housing 10 to communicate with each other are formed side by side along the circumferential direction. Before the igniter 40 is operated, the gas discharge port 102 is closed by a seal tape not illustrated.

Here, as illustrated in FIG. 1, the lower shell 30 of the housing 10 is provided with an attachment portion 304 attached with the igniter 40. In the present embodiment, the attachment portion 304 is formed integrally with the bottom plate portion 302. That is, the attachment portion 304 made of metal is formed by a part of the housing 10. As illustrated in FIG. 1, the attachment portion 304 is formed in a substantially tubular shape with a part of the lower shell 30 protruding upward from the bottom plate portion 302. The upper end portion of the attachment portion 304 includes an attachment hole 304a through which a pair of conductive pins 4 of the igniter 40 is inserted. The igniter assembly X1 according to the first embodiment includes the igniter 40, the attachment portion 304, the holding part 50, the tubular wall portion 60, and the lid member 70.

Igniter

Figure 2:
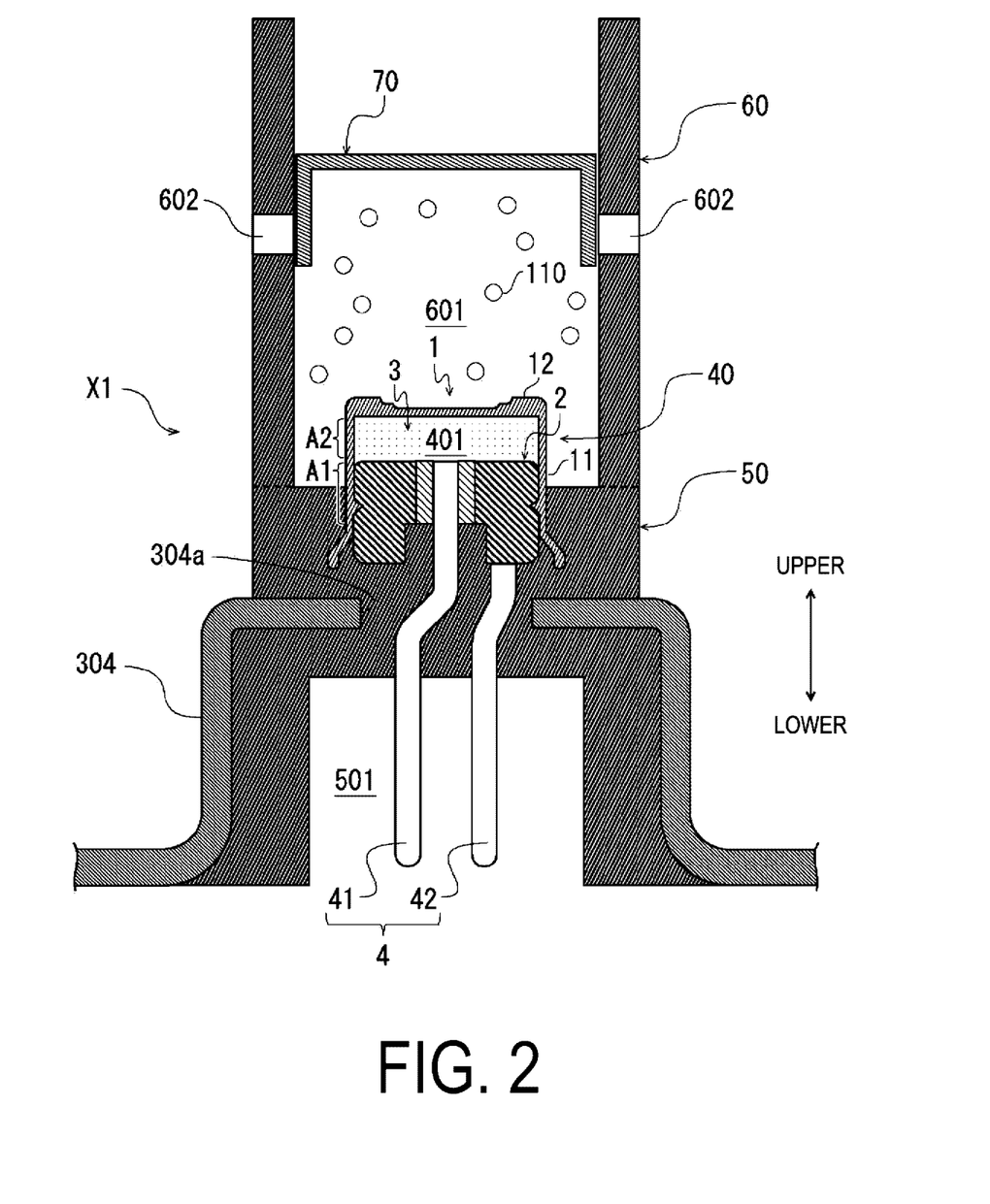
FIG. 2 is a cross-sectional view of the igniter assembly according to the first embodiment.

FIG. 2 is a cross-sectional view of the igniter assembly X1 according to the first embodiment. FIG. 2 illustrates a state before the igniter 40 is operated. As illustrated in FIG. 2, the igniter 40 includes a cup body 1 which is made of metal and is an example of the "container" of the present disclosure, a metal header 2, an ignition charge 3, and the pair of conductive pins 4 (41 and 42). The cup body 1 is formed of a metal material in a bottomed tubular shape, and includes a tubular peripheral wall portion 11 and a lid wall portion 12 that closes one end portion (upper end portion) of the peripheral wall portion 11. The metal material forming the cup body 1 is not particularly limited, and examples thereof include stainless steel, aluminum, and iron. The metal header 2 is a closing member formed of a metal material in a circular columnar shape, is disposed inside the cup body 1, and closes an opening formed in the other end portion (lower end portion) of the peripheral wall portion 11. The metal header 2 is welded to an inner wall of the peripheral wall portion 11 on the outer peripheral surface thereof. As illustrated in FIG. 2, the metal header 2 is disposed inside the cup body 1 and closes the opening of the peripheral wall portion 11, whereby the peripheral wall portion 11 of the cup body 1 includes, in the axial direction thereof, a contact region A1 in contact with the peripheral wall portion 11 and a non-contact region A2 that is a region on the lid wall portion 12 side relative to the contact region A1 and is not in contact with the metal header 2. The non-contact region A2 of the peripheral wall portion 11, the lid wall portion 12, and the metal header 2 define an accommodating space 401, which is a space filled with the ignition charge 3. The pair of conductive pins 4 extends downward from the metal header 2. A connector (not illustrated) for supplying electric power from an external power supply is connected to the pair of conductive pins 4.

The igniter 40 is operated by electric power supplied to each of the conductive pins 4 via the connector, and ignites the ignition charge 3 filled in the accommodating space 401. When the lid wall portion 12 of the cup body 1 is ruptured by the combustion pressure of the ignition charge 3, the combustion product of the ignition charge 3 is emitted to the outside of the cup body 1.

Holding Part

The holding part 50 is formed of a resin material, and is provided between the igniter 40 and the attachment portion 304 to fix the igniter 40 to the attachment portion 304. At this time, as illustrated in FIG. 2, the holding part 50 holds the igniter 40 in a state where the cup body 1 and the metal header 2 are positioned in the housing 10, the pair of conductive pins 4 is inserted into the attachment hole 304a, and the tips thereof are positioned outside the housing 10. The holding part 50 covers the contact region A1 of the peripheral wall portion 11, the metal header 2, and the attachment portion 304 to fix the igniter 40 to the attachment portion 304, and closes the attachment hole 304a to maintain airtightness in the housing 10. A part of the holding part 50 forms, inside the attachment portion 304, a connector insertion space 501 into which the connector for supplying electric power to the conductive pins 4 can be inserted. The holding part 50 holds the igniter 40 in such a manner that the non-contact region A2 of the peripheral wall portion 11 and the lid wall portion 12 are exposed in an emitting space 601 described below, and the lower end of the pair of conductive pins 4 is exposed in the connector insertion space 501. The insulating property between the pair of conductive pins 4 is maintained by covering a part of the pair of conductive pins 4 with the holding part 50.

Tubular Wall Portion

As illustrated in FIG. 2, the tubular wall portion 60 is formed in a tubular shape by a resin material, surrounds the peripheral wall portion 11 (more specifically, the non-contact region A2 of the peripheral wall portion 11) of the cup body 1, and extends upward from the holding part 50. Inside the tubular wall portion 60, the emitting space 601, which is a space where a combustion product of the ignition charge 3 is emitted, is formed. The emitting space 601 is filled with the first gas generating agent 110 of which combustion is caused by operation of the igniter 40. The first gas generating agent 110 is ignited by the combustion product of the ignition charge 3 emitted by operation of the igniter 40 and generates a combustion gas. The holding part 50 and the tubular wall portion 60 are integrally formed as one member and are continuous with each other. In the tubular wall portion 60, a plurality of communication holes 602 allowing the inside and the outside of the emitting space 601 to communicate with each other are formed side by side along the circumferential direction.

The holding part 50 and the tubular wall portion 60 are integrally formed by injection-molding a resin material in a manufacturing process of the igniter assembly X1. As the resin material forming the holding part 50 and the tubular wall portion 60, a resin material having excellent heat resistance, durability, corrosion resistance, and the like after curing can be suitably used. Examples of such resin material include: thermoplastic resins such as polybutylene terephthalate resin, polyethylene terephthalate resin, polyamide resin, polypropylene sulfide resin, and polypropylene oxide resin; and thermosetting resins such as epoxy resin.

Lid Member

As illustrated in FIG. 1, the lid member 70 is a member that defines the emitting space 601 together with the tubular wall portion 60 by being fitted into the tubular wall portion 60 from an opening formed at the upper end portion of the tubular wall portion 60. As illustrated in FIG. 1, the lid member 70 closes the communication hole 602 by covering the communication hole 602 from the inside of the tubular wall portion 60 before the igniter 40 is operated.

Spring Member

As illustrated in FIG. 1, the spring member SP1 is an elastic member provided between the lid member 70 and the top plate portion 202 of the upper shell 20. The spring member SP1 presses the lid member 70 downward (that is, the emitting space 601 side) by its biasing force, thereby inhibiting the lid member 70 from coming out of the tubular wall portion 60 and inhibiting the first gas generating agent 110 filled in the emitting space 601 from rattling.

Filter

As illustrated in FIG. 1, the filter F1 is formed in a tubular shape, and is arranged between the igniter assembly X1 and the gas discharge port 102 in a state where the upper end portion is supported by the top plate portion 202 of the upper shell 20 and the lower end portion is supported by the bottom plate portion 302 of the lower shell 30. Accordingly, a combustion chamber 101 is formed between the igniter assembly X1 and the filter F1. The combustion chamber 101 is filled with the second gas generating agent 120 of which combustion is caused by operation of the igniter 40. The second gas generating agent 120 is ignited by the combustion gas of the first gas generating agent 110 of which combustion is caused by operation of the igniter 40 and generates a combustion gas. The filter F1 is configured to allow the combustion gas to pass therethrough, and the combustion gas in the combustion chamber 101 is cooled by passing through the filter F1. At this time, the filter F1 filters the combustion gas by filtering a combustion residue of the combustion gas.

Gas Generating Agent

The first gas generating agent 110 uses a gas generating agent having a relatively low combustion temperature. The combustion temperature of the first gas generating agent 110 is desirably within a range from 1000° C. to 1700° C., and for example, a single-hole circular columnar-type gas generating agent may be used, which includes guanidine nitrate (41 wt. %), basic copper nitrate (49 wt. %), and a binder and an additive. Furthermore, the same and/or similar type of gas generating agent as the first gas generating agent 110 can be used for the second gas generating agent 120. However, the first gas generating agent 110 and the second gas generating agent 120 are not limited to those described above. The first gas generating agent 110 and the second gas generating agent 120 may be gas generating agents of an identical type, an identical shape, and an identical dimension, or may be gas generating agents of different types, different shapes, or different dimensions.

Operation

Next, operations of the gas generator 100 will be described. In a state where the gas generator 100 is assembled to an automobile, the connector inserted into the connector insertion space 501 is connected to the igniter 40, and power can be supplied to the igniter 40. In this state, when a sensor (not illustrated) mounted on the automobile detects an impact, electric power from an external power supply is supplied to the pair of conductive pins 4 via the connector, whereby the igniter 40 is operated and causes combustion of the ignition charge 3 in the accommodating space 401.

As the pressure in the accommodating space 401 rises with the combustion of the ignition charge 3, the cup body 1 ruptures, and a high-temperature flame that is a combustion product of the ignition charge 3 is emitted to the emitting space 601. Accordingly, the first gas generating agent 110 in the emitting space 601 is ignited. Due to the pressure (hereinafter, also called combustion pressure) of the combustion gas of the first gas generating agent 110, the lid member 70 slides upward (that is, the opening end portion side of the tubular wall portion 60) against the biasing force of the spring member SP1. Accordingly, the closed state of the communication hole 602 by the lid member 70 is released, and the combustion gas of the first gas generating agent 110 is emitted from the communication hole 602 to the combustion chamber 101.

The second gas generating agent 120 is ignited by the combustion gas of the first gas generating agent 110 emitted from the communication hole 602 to the combustion chamber 101, whereby the combustion gas of the second gas generating agent 120 is generated in the combustion chamber 101. The combustion gas in the combustion chamber 101 is cooled and filtered by the filter F1, then breaks a seal tape closing the gas discharge port 102, and is emitted from the gas discharge port 102 to the outside of the housing 10. Accordingly, the airbag is inflated, a cushion is formed between an occupant and a hard structure, and thus the occupant is protected from the impact.

Lid Wall Portion

When the igniter 40 is operated, the pressure in the accommodating space 401 rises due to the combustion of the ignition charge 3 filled in the accommodating space 401, whereby the lid wall portion 12 of the cup body 1 is ruptured. Accordingly, a flame that is a combustion product of the ignition charge 3 is emitted into the emitting space 601, and the first gas generating agent 110 in the emitting space 601 is ignited. At this time, the lid wall portion 12 of the cup body 1 is ruptured from the central portion, as a starting point, in the radial direction of the peripheral wall portion 11. and the lid wall portion 12 is deformed and thus opens outward in the radial direction from the upper end portion, as the starting point, of the peripheral wall portion 11. In the following description, the "radial direction" refers to the radial direction of the peripheral wall portion 11 unless otherwise specified. Here, if the lid wall portion 12 ruptured by the lid wall portion 12 largely opening comes into strong contact with the tubular wall portion 60, and a large load acts on the tubular wall portion 60, the tubular wall portion 60 is deformed and may have a crack or damage. In such a case, there is a concern that the crack or damage propagates to the holding part 50, holding of the igniter 40 becomes insufficient, or the sealability of the gas generator 100 is impaired.

On the other hand, in the igniter assembly X1 according to the present embodiment, the lid wall portion 12 of the cup body 1 is configured in such a manner that the lid wall portion 12 can be inhibited from largely opening when the igniter 40 is operated and a large load can be inhibited from acting on the tubular wall portion 60. Hereinafter, the lid wall portion 12 will be described in detail.

Figure 3:
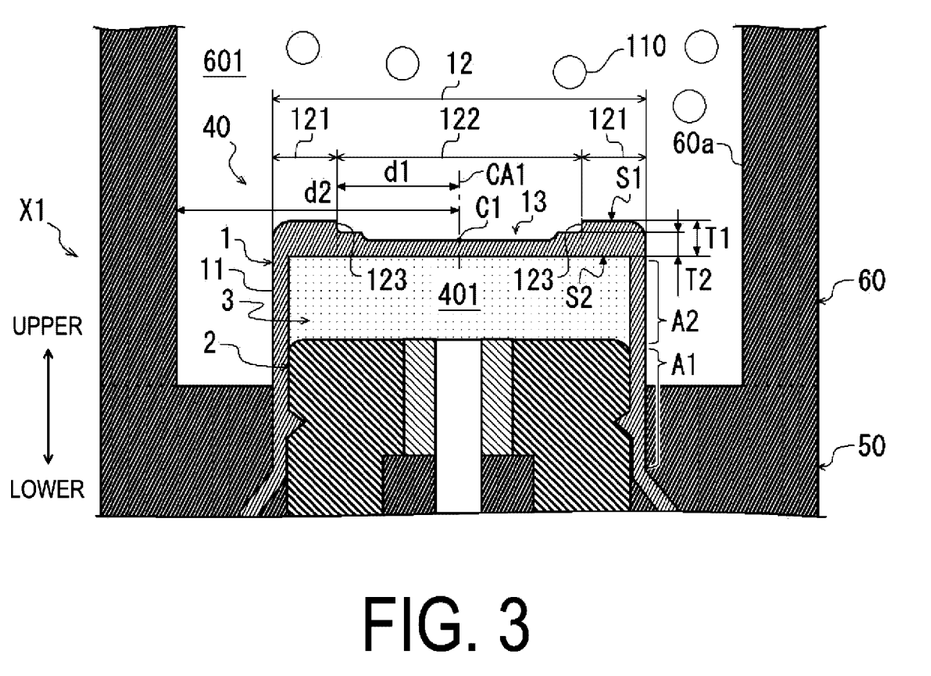
FIG. 3 is a cross-sectional view illustrating a state near a cup body before an igniter is operated in the igniter assembly according to the first embodiment.
Figure 4:
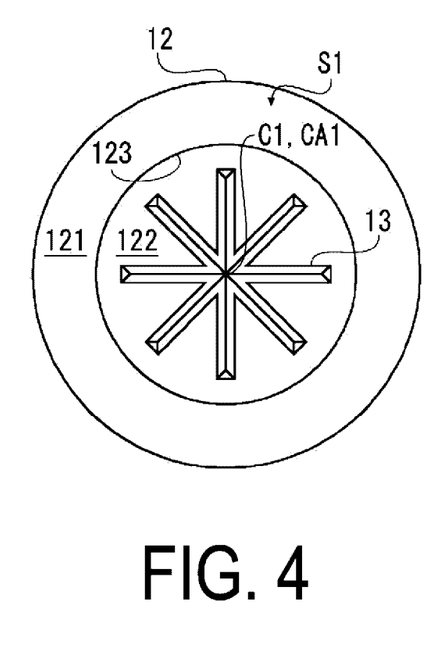
FIG. 4 is a top view illustrating a state of a lid wall portion of the cup body before the igniter is operated in the igniter assembly according to the first embodiment.

FIG. 3 is a cross-sectional view illustrating a state near the cup body 1 before the igniter 40 is operated in the igniter assembly X1 according to the first embodiment. FIG. 4 is a top view illustrating a state of the lid wall portion 12 of the cup body 1 before the igniter 40 is operated in the igniter assembly X1 according to the first embodiment. As illustrated in FIGS. 3 and 4, the lid wall portion 12 of the cup body 1 according to the present embodiment includes an annular outer peripheral region portion 121 connected to the upper end portion (one end portion) of the peripheral wall portion 11, and the central region portion 122 positioned radially inward of the outer peripheral region portion 121.

As illustrated in FIG. 3, the outer peripheral region portion 121 extends radially inward from the upper end portion of the peripheral wall portion 11, and is formed in an annular shape about a central axis CA1 of the peripheral wall portion 11. The central region portion 122 is a portion, surrounded by the outer peripheral region portion 121, of the lid wall portion 12. and is connected to an inner peripheral edge of the outer peripheral region portion 121. The central region portion 122 is formed at a position radially inward of the outer peripheral region portion 121, and the central portion C1 in the radial direction of the central region portion 122 is positioned on the central axis CA1 of the peripheral wall portion 11. As illustrated in FIG. 3, when the thickness of the outer peripheral region portion 121 (thickness in the axial direction of the peripheral wall portion 11) is T1 and the thickness of the central region portion 122 is T2, T1>T2 holds. That is, the outer peripheral region portion 121 is formed thicker than the central region portion 122.

Here, a surface (that is, the upper surface of the lid wall portion 12) of the lid wall portion 12 facing the emitting space 601 is an emitting surface S1, and the opposite surface (that is, the lower surface of the lid wall portion 12) defining the accommodating space 401 is an accommodating surface S2. At this time, as illustrated in FIG. 3, the outer peripheral region portion 121 and the central region portion 122 are connected in such a manner that the emitting surface S1 is recessed on the accommodating space 401 side in the central region portion 122. Accordingly, the connection portion between the outer peripheral region portion 121 and the central region portion 122 forms a step portion 123 on the emitting space 601 side.

As illustrated in FIG. 4, a plurality of grooves 13 extending radially from the central portion C1, as a starting point, of the central region portion 122 are formed in the central region portion 122. The plurality of grooves 13 are formed on the emitting surface S1 side, and extend in the radial direction between the central portion C, and the outer peripheral region portion 121. As illustrated in FIG. 4, in the present embodiment, eight grooves 13 are formed at equal angular intervals. However, the technique according to the present disclosure is not limited to such a configuration.

As illustrated in FIG. 3, when a distance in the radial direction from the central portion C1 of the central region portion 122 to the outer peripheral region portion 121 is d1, and a distance in the radial direction from the central portion C1 to the tubular wall portion 60 (more specifically, an inner peripheral surface 60a of the tubular wall portion 60) is d2, $d1 \leq 1/2 \times d2$ holds. That is, d1 is ½ or less of d2.

Actions and Effects

Figure 5:
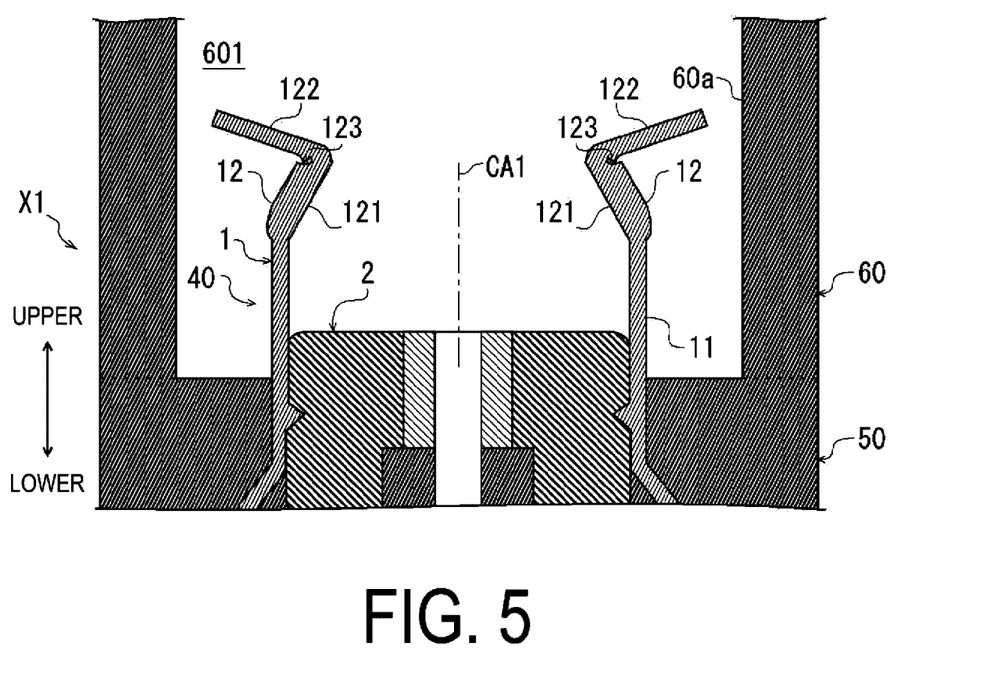
FIG. 5 is a cross-sectional view illustrating a state in which the igniter is operated and the lid wall portion of the cup body is ruptured in the igniter assembly according to the first embodiment.

FIG. 5 is a cross-sectional view illustrating a state in which the igniter 40 is operated and the lid wall portion 12 of the cup body 1 is ruptured in the igniter assembly X1 according to the first embodiment. As described above, the igniter assembly X1 according to the present embodiment includes the igniter 40 that emits the combustion product of the ignition charge 3 to the outside of the cup body 1 when the lid wall portion 12 of the cup body 1 made of metal is ruptured when the igniter 40 is operated, and the tubular wall portion 60 made of resin and formed in a tubular shape in a manner that the peripheral wall portion 11 of the cup body 1 is surrounded, the tubular wall portion 60 inwardly forming the emitting space 601 in which the combustion product of the ignition charge 3 is emitted. The lid wall portion 12 includes the annular outer peripheral region portion 121 disposed inside the peripheral wall portion 11 in the radial direction of the peripheral wall portion 11 and the central region portion 122 disposed inside the outer peripheral region portion 121 in the radial direction, and the outer peripheral region portion 121 is formed thicker than the central region portion 122.

Since the central region portion 122 is thinner than the outer peripheral region portion 121, when the igniter 40 is operated and the lid wall portion 12 of the cup body 1 is ruptured, the rupture starts from the central region portion 122 as illustrated in FIG. 5. At this time, the lid wall portion 12 is deformed and thus opens on the emitting space 601 side from the upper end portion, as a starting point, of the peripheral wall portion 11 by the combustion pressure of the ignition charge 3. Here, in the igniter assembly X1, since the outer peripheral region portion 121 is formed thicker than the central region portion 122, the outer peripheral region portion 121 is higher in rigidity and is less likely to be deformed than the central region portion 122. As a result, since the outer peripheral region portion 121 connected to the peripheral wall portion 11 is less likely to be deformed, the lid wall portion 12 is inhibited from largely opening. Thus, the ruptured lid wall portion 12 is inhibited from coming into strong contact with the tubular wall portion 60. That is, the ruptured lid wall portion 12 does not come into contact with the tubular wall portion 60, or even if the ruptured lid wall portion 12 comes into contact with the tubular wall portion 6, a large load does not occur.

Thus, according to the igniter assembly X1 according to the present embodiment, it is possible to inhibit a large load from acting on the tubular wall portion 60 due to the lid wall portion 12 ruptured when the igniter 40 is operated, and the occurrence of a crack or damage in the tubular wall portion 60 can be suppressed.

As illustrated in FIG. 5, when the lid wall portion 12 is ruptured by operation of the igniter 40, the central region portion 122 is deformed and thus opens on the emitting space 601 side from the connection portion with the outer peripheral region portion 121 as the starting point. Here, in the igniter assembly X1, the outer peripheral region portion 121 and the central region portion 122 are connected in such a manner that the emitting surface S1 of the lid wall portion 12 is recessed in the central region portion 122, whereby the connection portion between the outer peripheral region portion 121 and the central region portion 122 forms the step portion 123 on the emitting space 601 side. Therefore, as illustrated in FIG. 5. the central region portion 122 is inhibited from further opening by the step portion 123 abutting on the central region portion 122. As a result, the igniter assembly X1 can inhibit the central region portion 122 ruptured when the igniter 40 is operated from largely opening and coming into strong contact with the tubular wall portion 60. The technology of the present disclosure is not limited to this, and the outer peripheral region portion and the central region portion may be connected in such a manner that the central region portion is recessed on the accommodating surface facing the accommodating space.

Furthermore, in the igniter assembly X1 according to the present embodiment, the plurality of grooves 13 radially extending from the central portion C1 of the central region portion 122 as the starting point is formed in the central region portion 122 of the lid wall portion 12. The portion of the central region portion 122 where the groove 13 is formed is more fragile than other portions. In the igniter assembly X1, since the plurality of grooves 13 are radially formed from the central portion C1 as the starting point, the lid wall portion 12 can be easily ruptured. Furthermore, in the igniter assembly X1, the groove 13 is formed only in the central region portion 122 of the outer peripheral region portions 121 and the central region portion 122. According to the igniter assembly X1 thus configured, the lid wall portion 12 can be easily ruptured while suppressing deformation of the outer peripheral region portion 121. In the technology of the present disclosure, the groove in the central region portion is not necessarily formed.

Furthermore, in the igniter assembly X1 according to the present embodiment, the distance d1 in the radial direction from the central portion C1 of the central region portion 122 of the lid wall portion 12 to the outer peripheral region portion 121 is ½ or less of the distance in the radial direction from the central portion C1 to the tubular wall portion 60. In this manner, even when the central region portion 122 is deformed and thus folded back from the connection portion with the outer peripheral region portion 121 when the igniter 40 is operated, and even if the central region portion 122 falls on the tubular wall portion 60 side, the central region portion 122 does not reach the tubular wall portion 60. As a result, according to the igniter assembly X1, it is possible to inhibit the central region portion 122 ruptured when the igniter 40 is operated from coming into contact with the tubular wall portion 60. However, the technique according to the present disclosure is not limited to such a configuration.

Modified Example

Figure 6:
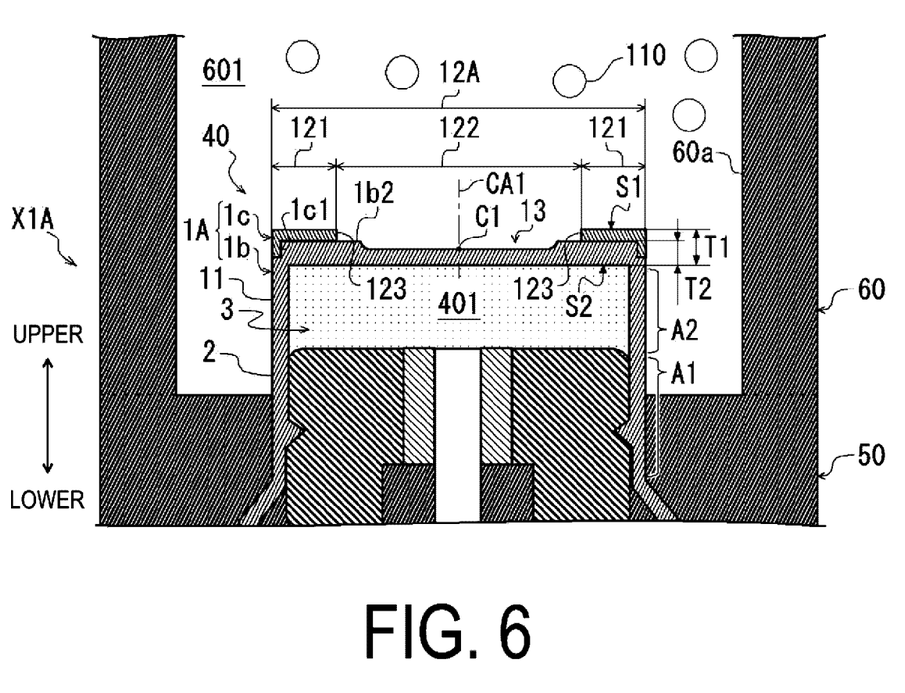
FIG. 6 is a cross-sectional view illustrating a state near the cup body before the igniter is operated in the igniter assembly according to a modified example of the first embodiment.

FIG. 6 is a cross-sectional view illustrating a state near a cup body 1A before the igniter 40 is operated in an igniter assembly X1A according to a modified example of the first embodiment. Hereinafter, the igniter assembly X1A according to the modified example will be described with focus on differences from the igniter assembly X1, and same and/or similar configurations will be denoted by the identical reference signs, and a detailed description will be omitted.

As illustrated in FIG. 6, the igniter assembly X1A according to the modified example is different from the igniter assembly X1 in that the cup body 1A is formed of two components. More specifically, the cup body 1A includes a cup main body 1b formed in a bottomed tubular shape, and an annular ring member 1c. The cup main body 1b includes the peripheral wall portion 11 and a lid wall portion main body 1b2 that closes one end portion (upper end portion) of the peripheral wall portion 11. A lid wall portion 12A is formed by installing the ring member 1c on this lid wall portion main body 1b2. The ring member 1c forms the outer peripheral region portion 121 together with the lid wall portion main body 1b2 by overlapping the lid wall portion main body 1b2. In the lid wall portion 12A, a region where the ring member 1c overlaps the lid wall portion main body 1b2 forms the outer peripheral region portion 121, and a region where the ring member 1c does not overlap the lid wall portion main body 1b2 forms the central region portion 122. Accordingly, the outer peripheral region portion 121 is formed thicker than the central region portion 122. As illustrated in FIG. 6, a fitting portion 1c1 to be fitted to the lid wall portion main body 1b2 is formed in the ring member 1c. Accordingly, the ring member 1c is inhibited from falling off from the lid wall portion main body 1b2, and the cup main body 1b and the ring member 1c are integrally held.

In the igniter assembly X1A according to the modified example, the lid wall portion 12A of the cup body 1A includes the annular outer peripheral region portion 121 disposed inside the peripheral wall portion 11 in the radial direction of the peripheral wall portion 11 and the central region portion 122 disposed inside the outer peripheral region portion 121 in the radial direction, and the outer peripheral region portion 121 is formed thicker than the central region portion 122. As a result, similarly to the igniter assembly X1, it is possible to inhibit a large load from acting on the tubular wall portion 60 due to the lid wall portion 12A ruptured when the igniter 40 is operated, and the occurrence of a crack or damage in the tubular wall portion 60 can be suppressed.

Second Embodiment

Figure 7:
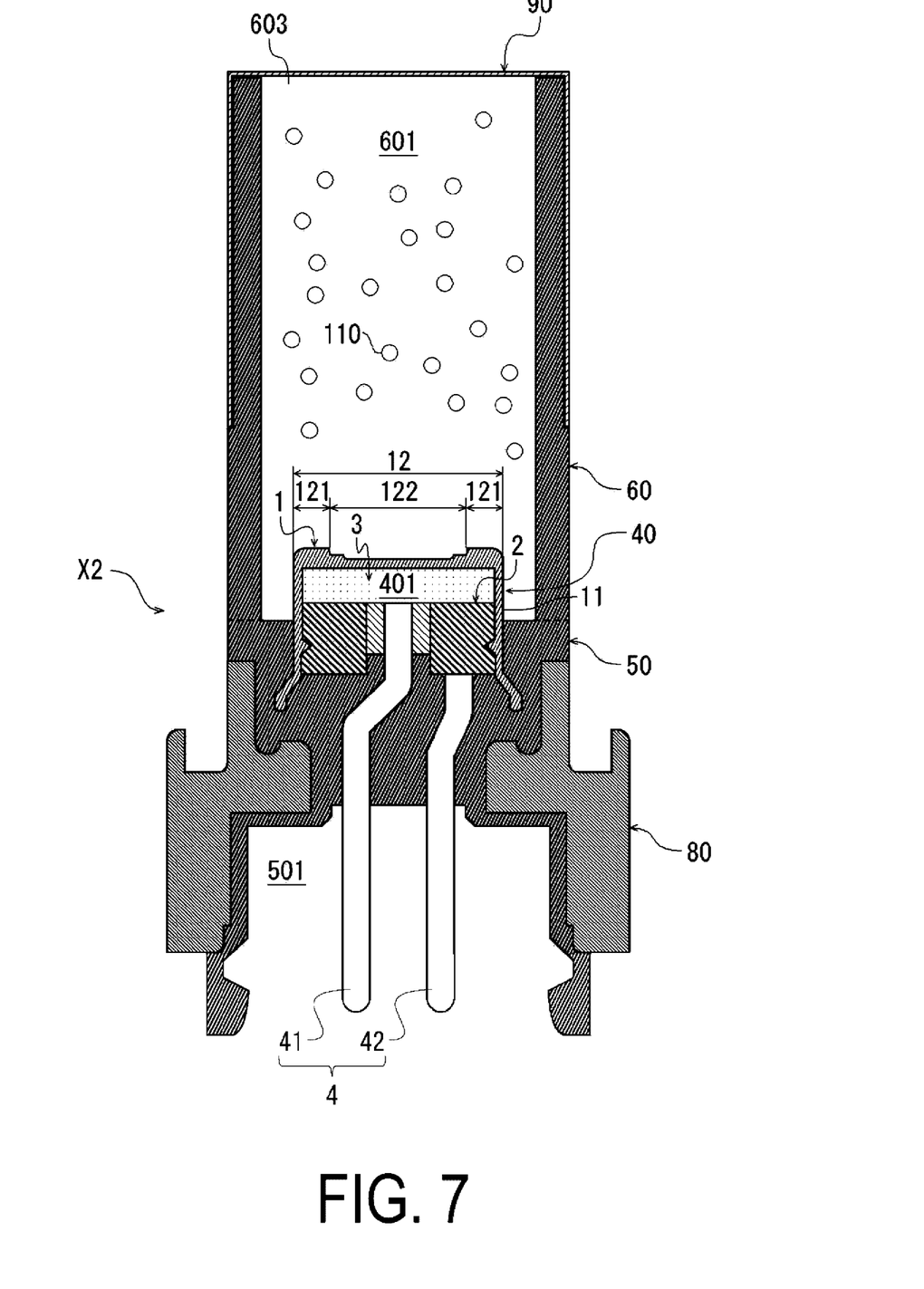
FIG. 7 is a cross-sectional view of an igniter assembly according to a second embodiment.

FIG. 7 is a cross-sectional view of an igniter assembly X2 according to the second embodiment. FIG. 7 illustrates a state before the igniter 40 is operated. The igniter assembly X2 according to the second embodiment is an igniter assembly of a gas generator for a seat belt retractor applied with the technology of the present disclosure. However, the application of the igniter assembly X2 according to the second embodiment is not limited to this, and may be applied to a gas generator for an airbag, for example. Hereinafter, the igniter assembly X2 according to the second embodiment will be described with focus on differences from the igniter assembly X1 according to the first embodiment, and same and/or similar configurations will be denoted by the identical reference signs, and a detailed description will be omitted.

The igniter assembly X2 according to the second embodiment is incorporated in a gas generator (not illustrated) for a seat belt retractor, and is configured to cause combustion of the first gas generating agent 110 filled in the emitting space 601 by operating the igniter 40 and emit the combustion gas that is a combustion product thereof for winding up loosening of a seat belt.

As illustrated in FIG. 7, the igniter assembly X2 according to the second embodiment includes the igniter 40, an attachment portion 80, the holding part 50, the tubular wall portion 60, and a lid member 90. The attachment portion 80 is a collar member formed of a metal material in a tubular shape, and is different from the attachment portion 304 according to the first embodiment in that the attachment portion 80 is separately from the housing. The pair of conductive pins 4 of the igniter 40 is inserted into the attachment portion 80. The igniter 40 is fixed to the attachment portion 80 by the holding part 50 provided between the igniter 40 and the attachment portion 80. The igniter assembly X2 is attached to the gas generator by fixing this attachment portion 80 to the housing of the gas generator. The lid member 90 is a member formed in a bottomed tubular shape, closes an opening 603 of the tubular wall portion 60 by being externally fitted to the upper end portion of the tubular wall portion 60, and defines the emitting space 601 together with the tubular wall portion 60. The communication hole 602 is not formed in the tubular wall portion 60 according to the second embodiment.

In the second embodiment, when the igniter 40 is operated, the cup body 1 is ruptured by the combustion of the ignition charge 3 in the accommodating space 401, and a high-temperature flame that is a combustion product of the ignition charge 3 is emitted to the emitting space 601. Accordingly, the first gas generating agent 110 filled in the emitting space 601 is ignited. When the lid member 90 is ruptured by the combustion pressure of the first gas generating agent 110. the combustion gas of the first gas generating agent 110 is emitted from the opening 603 of the tubular wall portion 60.

As described above. also in the igniter assembly X2 according to the second embodiment, the lid wall portion 12 of the cup body 1 includes the annular outer peripheral region portion 121 disposed inside the peripheral wall portion 11 in the radial direction of the peripheral wall portion 11 and the central region portion 122 disposed inside the outer peripheral region portion 121 in the radial direction, and the outer peripheral region portion 121 is formed thicker than the central region portion 122. As a result, same and/or similar effects to those of the igniter assembly X1 according to the first embodiment can be achieved. That is, according to the igniter assembly X2 according to the second embodiment, it is possible to inhibit a large load from acting on the tubular wall portion 60 due to the lid wall portion 12 ruptured when the igniter 40 is operated, and it is possible to prevent problems such as a crack or damage from occurring in the tubular wall portion 60.

Others

While embodiments of the igniter assembly and the gas generator according to the present disclosure have been described above, each aspect disclosed in the present description can be combined with any other features disclosed in the present description. In the above embodiments, an example in which the igniter assembly of the present disclosure is applied to a single type gas generator including only one igniter has been described, but the igniter assembly of the present disclosure may also be applied to a gas generator including a plurality of igniters. In the above embodiments, an example in which the igniter assembly is applied to a gas generator for an airbag or a seat belt retractor has been described, but the igniter assembly may be applied to another gas generator. A housing other than the housing of the gas generator may be used as an attachment target object of the igniter assembly.

REFERENCE SIGNS LIST

1 Cup body (example of container)
11 Peripheral wall portion
12 Lid wall portion
121 Outer peripheral region portion
122 Central region portion
13 Groove
3 Ignition charge
10 Housing
40 Igniter
401 Accommodating space
50 Holding part
60 Tubular wall portion
601 Emitting space
100 Gas generator
101 Combustion chamber
102 Gas discharge port
110 First gas generating agent
120 Second gas generating agent
X1 Igniter assembly
S1 Emitting surface

The invention claimed is:

1. An igniter assembly, comprising:
an igniter including a container made of metal and an ignition charge, the igniter being configured to emit a combustion product of the ignition charge to an outside of the container when a lid wall portion is ruptured when the igniter is operated, the container including a peripheral wall portion having a tubular shape and the lid wall portion configured to close one end portion of the peripheral wall portion, the ignition charge being filled in an accommodating space defined by the peripheral wall portion and the lid wall portion; and
a tubular wall portion made of resin and formed in a tubular shape in a manner that the peripheral wall portion is surrounded, the tubular wall portion inwardly forming an emitting space in which the combustion product of the ignition charge is emitted, wherein
the lid wall portion includes an annular outer peripheral region portion disposed inside the peripheral wall portion in a radial direction of the peripheral wall portion, and a central region portion positioned inside the outer peripheral region portion in a radial direction, an outer periphery of the outer peripheral region portion is connected to the peripheral wall portion at a first connection portion, and an outer periphery of the central region portion is connected to the outer peripheral region portion at a second connection portion,
the outer peripheral region portion is formed thicker than the central region portion, and
upon activation of the igniter assembly, the annular outer peripheral region portion is configured to deform at the first connection portion in an upward direction by a first angle with respect to a central axis of the igniter assembly, and the central region portion is configured to deform in the upward direction at the second connection portion by a second angle with respect to the annular outer peripheral region portion.

2. The igniter assembly according to claim 1, wherein
the outer peripheral region portion and the central region portion are connected in a manner that an emitting surface facing the emitting space at the lid wall portion is recessed at the central region portion.

3. The igniter assembly according to claim 1, wherein
the central region portion includes a plurality of grooves radially extending from a central portion, as a starting point, of the central region portion.

4. The igniter assembly according to claim 1, wherein the emitting space is filled with a first gas generating agent that is ignited by a combustion product of the ignition charge.

5. A gas generator, comprising:
the igniter assembly according to claim 1;
a housing attached with the igniter assembly;
a combustion chamber formed inside the housing and filled with a second gas generating agent of which combustion is caused by operation of the igniter; and
a gas discharge port formed at the housing and causing the combustion chamber and an external space of the housing to communicate with each other.

6. The igniter assembly according to claim 1, wherein the outer peripheral region portion includes a ring member forming an upper surface of the outer peripheral region portion.

7. The igniter assembly according to claim 1, wherein
a gap is maintained between an open end of the central region portion and an inner peripheral surface of the tubular wall portion after activation of the igniter assembly.

8. An igniter assembly, comprising:
an igniter including a container made of metal and an ignition charge, the igniter being configured to emit a combustion product of the ignition charge to an outside of the container when a lid wall portion is ruptured when the igniter is operated, the container including a peripheral wall portion having a tubular shape and the lid wall portion configured to close one end portion of the peripheral wall portion, the ignition charge being filled in an accommodating space defined by the peripheral wall portion and the lid wall portion; and
a tubular wall portion made of resin and formed in a tubular shape in a manner that the peripheral wall portion is surrounded, the tubular wall portion inwardly forming an emitting space in which the combustion product of the ignition charge is emitted, wherein
the lid wall portion includes an annular outer peripheral region portion disposed inside the peripheral wall portion in a radial direction of the peripheral wall portion, and a central region portion positioned inside the outer peripheral region portion in a radial direction, an outer periphery of the outer peripheral region portion is connected to the peripheral wall portion at a first connection portion, and an outer periphery of the central region portion is connected to the outer peripheral region portion at a second connection portion,
the outer peripheral region portion is formed thicker than the central region portion, and
a thickness of the annular outer peripheral region portion in an axial direction of the peripheral wall portion is greater than a thickness of the peripheral wall portion in a radial direction of the peripheral wall portion, such that upon activation of the igniter assembly, the annular outer peripheral region portion is configured to deform at the first connection portion in an upward direction by a first angle with respect to a central axis of the igniter assembly, and the central region portion is configured to deform in the upward direction at the second connection portion by a second angle with respect to the annular outer peripheral region portion.

9. The igniter assembly according to claim 8, wherein the outer peripheral region portion and the central region portion are connected in a manner that an emitting surface facing the emitting space at the lid wall portion is recessed at the central region portion.

10. The igniter assembly according to claim 8, wherein the central region portion includes a plurality of grooves radially extending from a central portion, as a starting point, of the central region portion.

11. The igniter assembly according to claim 8, wherein the emitting space is filled with a first gas generating agent that is ignited by a combustion product of the ignition charge.

12. A gas generator, comprising:
the igniter assembly according to claim 8;
a housing attached with the igniter assembly;
a combustion chamber formed inside the housing and filled with a second gas generating agent of which combustion is caused by operation of the igniter; and
a gas discharge port formed at the housing and causing the combustion chamber and an external space of the housing to communicate with each other.

13. An igniter assembly, comprising:
an igniter including a container made of metal and an ignition charge, the igniter being configured to emit a combustion product of the ignition charge to an outside of the container when a lid wall portion is ruptured when the igniter is operated, the container including a peripheral wall portion having a tubular shape and the lid wall portion configured to close one end portion of the peripheral wall portion, the ignition charge being filled in an accommodating space defined by the peripheral wall portion and the lid wall portion; and
a tubular wall portion made of resin and formed in a tubular shape in a manner that the peripheral wall portion is surrounded, the tubular wall portion inwardly forming an emitting space in which the combustion product of the ignition charge is emitted, wherein
the lid wall portion includes an annular outer peripheral region portion disposed inside the peripheral wall portion in a radial direction of the peripheral wall portion, and a central region portion positioned inside the outer peripheral region portion in a radial direction, an outer periphery of the outer peripheral region portion is connected to the peripheral wall portion at a first connection portion, and an outer periphery of the central region portion is connected to the outer peripheral region portion at a second connection portion,
the outer peripheral region portion is formed thicker than the central region portion, and
an outer peripheral edge of the central region portion includes a thick edge to form a three-step thickness in the lid wall portion, such that upon activation of the igniter assembly, the annular outer peripheral region portion is configured to deform at the first connection portion in an upward direction by a first angle with respect to a central axis of the igniter assembly, and the central region portion is configured to deform in the upward direction at the second connection portion by a second angle with respect to the annular outer peripheral region portion.

14. The igniter assembly according to claim 13, wherein the outer peripheral region portion and the central region portion are connected in a manner that an emitting surface facing the emitting space at the lid wall portion is recessed at the central region portion.

15. The igniter assembly according to claim 13, wherein the central region portion includes a plurality of grooves radially extending from a central portion, as a starting point, of the central region portion.

16. The igniter assembly according to claim 13, wherein the emitting space is filled with a first gas generating agent that is ignited by a combustion product of the ignition charge.

17. A gas generator, comprising:
the igniter assembly according to claim 13;
a housing attached with the igniter assembly;
a combustion chamber formed inside the housing and filled with a second gas generating agent of which combustion is caused by operation of the igniter; and
a gas discharge port formed at the housing and causing the combustion chamber and an external space of the housing to communicate with each other.

18. The igniter assembly according to claim 1, wherein upon activation of the igniter assembly, the annular outer peripheral region portion is configured to deform at the first connection portion in an upward direction by a first angle with respect to a central axis of the igniter assembly while maintaining the outer peripheral region portion flat, and the central region portion is configured to deform in the upward direction at the second connection portion by a second angle with respect to the annular outer peripheral region portion while maintaining the central region portion flat.

19. The igniter assembly according to claim 8, wherein upon activation of the igniter assembly, the annular outer peripheral region portion is configured to deform at the first connection portion in an upward direction by a first angle with respect to a central axis of the igniter assembly while maintaining the outer peripheral region portion flat, and the central region portion is configured to deform in the upward direction at the second connection portion by a second angle with respect to the annular outer peripheral region portion while maintaining the central region portion flat.

20. The igniter assembly according to claim 13, wherein upon activation of the igniter assembly, the annular outer peripheral region portion is configured to deform at the first connection portion in an upward direction by a first angle with respect to a central axis of the igniter assembly while maintaining the outer peripheral region portion flat, and the central region portion is configured to deform in the upward direction at the second connection portion by a second angle with respect to the annular outer peripheral region portion while maintaining the central region portion flat.

* * * * *